United States Patent Office 3,787,452
Patented Jan. 22, 1974

3,787,452
EPOXYSILANES
Ernst Leumann, Arlesheim, and Hans Lehmann, Basel, Switzerland, assignors to Ciba-Geigy Corporation, Ardsley, N.Y.
No Drawing. Filed June 23, 1972, Ser. No. 265,919
Claims priority, application Switzerland, June 29, 1971, 9,527/71
Int. Cl. C07d 1/18
U.S. Cl. 260—348 SC       4 Claims

ABSTRACT OF THE DISCLOSURE

The invention relates to epoxysilanes of the Formula I

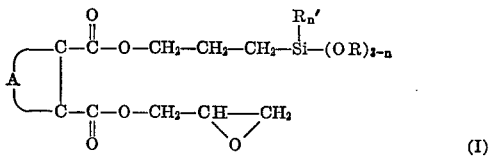
(I)

in which A denotes a cycloaliphatic five-membered or six-membered ring or an aromatic ring, R and R' each denote an alkyl group with 1 to 4 carbon atoms and $n$ denotes 0, 1 or 2, and their use in adhesives, to which they impart increased resistance to tropical conditions and to water. Embodiments of the invention are glycidyltriethoxysilyl esters of tetra- or hexa-hydrophthalic acid.

---

The invention relates to new epoxysilanes and their use in adhesives, especially those based on epoxide resin, to which they impart increased resistance to tropical conditions and to water.

Epoxysilanes have been known for a number of years and can be of such structure that the epoxide groups are linked to the Si atom via C atoms or are linked to the Si atom via, for example, O-bridges.

It is furthermore known that certain properties such as water resistance, heat stability and mechanical properties can be improved by adding epoxysilanes to plastics.

If adhesives are intended to show good water resistance, it is appropriate to employ those epoxysilanes which carry the epoxide group in hydrocarbon radicals which are stable to hydrolysis or in glycidyl-ether groupings and are linked to the Si atoms via C atoms. Such epoxysilanes are known.

It was therefore surprising and not foreseeable that with new epoxysilanes according to the invention, which carry the epoxide group in ester groups which are known to be sensitive to hydrolysis, it is possible to achieve adhesive bonds, especially adhesive bonds to metals, which show increased water resistance and an improvement in mechanical properties, such as the tensile shear strength, can be achieved relative to the known epoxysilanes having hydrolysis-resistant epoxide groups, if the epoxysilanes are used in adhesives, especially those based on epoxide resin.

The epoxysilanes according to the invention correspond to the Formula I

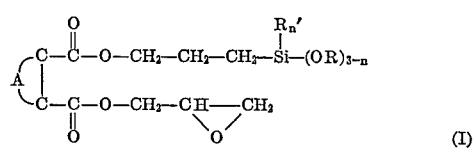
(I)

in which A denotes a cycloaliphatic five-membered or six-membered ring or an aromatic ring, R and R' each denote an alkyl group with 1 to 4 carbon atoms and $n$ denotes 0, 1 or 2.

Epoxysilanes of the Formula I in which A denotes a cycloaliphatic ring, especially a cyclohexane or cyclohexene ring, and $n$ denotes 0 or 1, are preferred.

Further, epoxysilanes of the Formula I which contain the methyl or ethyl group as the radical R are preferred. If the radical R' is present, it is preferably the methyl group.

The compounds of the Formula I can be manufactured by reacting compounds of the Formula II

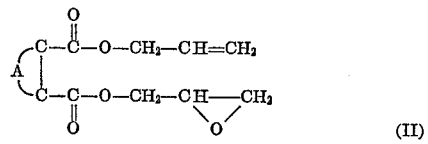
(II)

with silanes of the Formula III

(III)

The reaction preferably takes place at elevated temperature, for example between 100 and 150° C., and in the presence of a catalyst, for example based on metallic platinum or platinum compounds, such as platinum hexachloride. Advantageously, the more easily volatile component is used in a certain excess in this addition reaction and can, after completion of the reaction, be recovered by distillation and re-employed for a subsequent operation.

Preferably, allyl-glycidyl-hexahydrophthalic acid ester or allylglycidyl-tetrahydrophthalic acid ester is reacted with triethoxysilane or trimethoxysilane.

It has been found that these new epoxysilanes, if they are mixed into adhesives, especially those based on epoxide resin, which can be filled or unfilled, in amounts of 0.1 to 5%, preferably 1%, relative to the resin component, or are spread on the surfaces to be glued before application of the adhesive, lead to improved strength of the adhesive bonds as compared to expoysilanes hitherto commercially available, especially after storage in water and storage in a tropical climate. This is surprising in as much as the epoxysilanes hitherto employed are free of ester groups and it was to be expected, a priori, that the ester groups in the new compounds would be split hydrolytically, at least partially, particularly after storage in water or in a tropical climate, and would therefore result in a decrease in the strength of the adhesive bonds. Possible adhesives based on epoxide resin are all compounds carrying more than one epoxide group, especially the polyglycidyl ethers of bisphenol A. Though it is known from British patent specification 1,092,626 that by addition of epoxysilanes when glueing glass to glass or other non-metallic substances the strength of the adhesive joints can be maintained without a great decrease after storage in water, it was not possible to deduce therefrom that the silanes of the present invention would, in the case of the glueing of metal, even further improve the strength after storage in water, since the affinity to glass which is inherent in the silane cannot be invoked in the present case. The adhesives are used for glueing various substances, such as wood, glass and plastics, but above all for glueing metals, for example aluminium and its alloys.

EXAMPLE 1

(a) Hexahydrophthalic acid allyl-glycidyl ester

A mixture of 616 g. (4 mols) of hexahydrophthalic anhydride and 232 g. (4 mols) of allyl alcohol is slowly heated in a suitable stirred vessel, with stirrer, thermometer and reflux condenser, in an oil bath. At 40° C. all the anhydride has dissolved and at 110–120° C. the source of heat is removed because the exothermic effect of the reaction manifests itself. Within a few minutes, the temperature rises to 163° C. and then drops again to 105°

C. over the course of 30 minutes; the batch is left to stand overnight without stirring it. After this time, an acid number of 296.6 (theoretical, 264.6) is measured. For glycidylization, 2960 g. (32 mols) of epichlorohydrin are added to the mixture and the batch is warmed to 95° C. At this temperature, a solution of 12 g. of tetramethylammonium chloride in 40 g. of water is added and after removing the source of heat the $p_H$ value is followed by means of a glass electrode. It rises from 5.1 to 10 over the course of 10 minutes, with a simultaneous rise in the temperature of the mixture, which is kept at 100° C. by cooling. After a total of 15 minutes, the mixture is cooled to room temperature, the electrode is removed and a water separator is attached. The mixture is now heated to 50° C., 6 g. of tetramethylammonium chloride are again added and 400 g. of 50% strength sodium hydroxide solution (5 mols) are introduced dropwise from a dropping funnel over the course of 45 minutes, whilst simultaneously applying a vacuum of 115 mm. and removing the water introduced and the water produced. The removal of water is thereafter continued for a further 45 minutes and a total of 282 g. of water removed is obtained. 1,000 ml. of water are now added to the batch in order to dissolve the NaCl formed and the organic phase is separated off. The latter is successively washed with 1,000 ml. of 2.5% strength sodium hydroxide solution, 1,000 ml. of saturated monosodium phosphate solution and 1,000 ml. of water. The organic phase, 3,382.5 g., is thereafter concentrated on a water bath, up to an internal temperature of 95° C., under a pressure of 10 mm., whereby 2,242 g. of epichlorohydrin are recovered and 1,065.5 g. of crude ester are obtained. The latter is subsequently purified by distillation in a high vacuum, whereby 905 g. of allyl-glycidylhexahydrophthalate of the Formula IV, of boiling point$_{0.02}$ 134.5–138° C. are obtained (=84.3% of theory). The product has an epoxide content of 3.71 equivalents/kg. as compared to a theoretical content of 3.73.

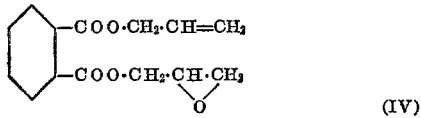

(IV)

(b) Hexahydrophthalic acid glycidyl-γ-triethoxysilylpropyl ester 197 g. of triethoxysilane (1.2 mols) which were mixed with 0.36 ml. of a 1% strength solution of $H_2PtCl_6 \cdot 6H_2O$ in diethylene glycol dimethyl ether, are added dropwise over the course of 30 minutes, in a suitable stirred vessel, to 268 to g. of hexahydrophthalic acid allyl-glycidyl ester (1 mole) at 115–120° C., whilst stirring. The reaction is slightly exothermic and is maintained at approx. 120° C. by occasional cooling. After a further 15 minutes, 0.18 ml. of the platinum salt solution is again added and the reaction is continued for 2½ hours at 120–125° C., after which time a further 0.18 ml. of platinum salt solution is added and the mixture is stirred for a further 1½ hours at the indicated temperature. Thereafter the reaction product is cooled and freed of unreacted triethoxysilane initially on a steam bath under a partial water pump vacuum and finally under a full water pump vacuum, whereby 43 g. are recovered. The residue is then purified by distillation in a high vacuum, whereby 357 g. of the silicon-containing ester of the Formula V, or 82.7% of theory, pass over under 0.01 mm. at 170–171° C., as a colorless mobile liquid.

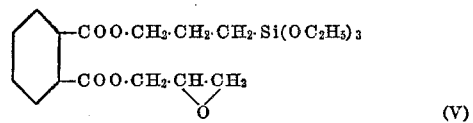

(V)

Addition of this compound, in an amount of about 1% to adhesives based on epoxide resin, yields products with which substantially better glueing of metals, for example as regards tensile shear strength, are achieved than without this compound.

EXAMPLE 2

In the manner described in Example 1, the tetrahydrophthalic acid allyl-glycidyl ester of the Formula VI

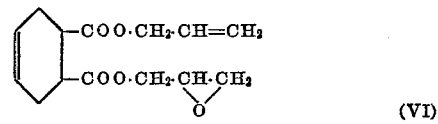

(VI)

which has a boiling point$_{0.01}$ of 123–125° C. and an epoxide content of 3.79 equivalents/kg. (theoretical, 3.76) is manufactured from tetrahydrophthalic anhydride, allyl alcohol and epichlorohydrin, and is reacted analogously with triethoxysilane. The tetrahydrophthalic acid glycidyl-γ-triethoxysilylpropyl ester thus obtained, having the structure shown below, of the Formula VII

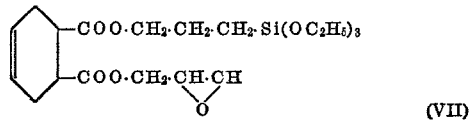

(VII)

has a boiling point of 159–160° C. under a vacuum of 0.001 mm.

Comparison experiment

In order to illustrate the effectiveness of the compounds according to the invention, the following experiments were carried out, in which 2 adhesives of different formulations (A and B) based on epoxide resin, (a) without added silane, (b) with the addition of 1% of 1-β-trimethoxysilylethyl - 3,4 - epoxycyclohexane (an epoxysilane commercially available under the tradename "Silan-A186" of UCC; compare also the article "Improving Adhesives With Silane Adhesive Promoters" by M. C. Polniaszek and R. H. Schaufelberger in "Adhesives Age," July 1968, pages 25–27) and (c) with the addition of 1% of one of the compounds according to the invention, in each case relative to the resin component of the adhesive, were used for glueing ground sheets of "Anticorodal B" (an aluminium alloy) of size 170 x 25 x 1.5 mm., the overlap length being 10 mm. All samples were cured under contact pressure for 16 hours at 40° C.

The two Tables I and II which follow show the various tensile shear strengths as measured after storage in water or under tropical conditions, the measured values representing in each case the mean of 5 measurements.

TABLE I

| | Tensile shear strength in kp./cm.² | | | | | |
|---|---|---|---|---|---|---|
| | Adhesive A | | | Adhesive B | | |
| Storage in water at 20° C., days | Without additive | 1% of "Silane A-186" (UCC) | 1% of product according to Example 1 | Without additive | 1% of "Silane A-186" (UCC) | 1% of product according to Example 1 |
| 0 | 130 | 140 | 170 | 180 | 200 | 200 |
| 30 | 170 | 180 | 200 | 150 | 200 | 210 |
| 60 | 170 | 190 | 210 | 130 | 200 | 210 |
| 90 | 170 | 190 | 220 | 120 | 180 | 220 |

TABLE II

| Storage under tropical conditions,[1] | Tensile shear strength in kp./cm.² | | | | | |
|---|---|---|---|---|---|---|
| | Adhesive A | | | Adhesive B | | |
| | Without additive | 1% of "Silane A-186" (UCC) | 1% of product according to Example 1 | Without additive | 1% of "Silane A-186" (UCC) | 1% of product according to Example 1 |
| 0 | 130 | 140 | 170 | 180 | 200 | 200 |
| 30 | 100 | 140 | 170 | 160 | 200 | 200 |
| 60 | 90 | 150 | 170 | 130 | 200 | 210 |
| 90 | 80 | 160 | 170 | 120 | 180 | 210 |

[1] Measured according to DIN 50,015 at 40° C. and 92% relative atmospheric humidity.

The two adhesives had the following composition:

Adhesive A, resin 44.5 parts of liquid epoxide resin based on bisphenol A, with an epoxide content of 5.4 equivalents/kg.
5.49 parts of polypropylene powder
45.59 parts of baryte
4.37 parts of "Bentone" (organic montmorillonite derivative)

Curing agent 33.20 parts of "Versamid 140" (a polyaminoamide of Schering AG, Bergkamen, West Germany)
4.98 parts of dimethylaminopropylamine
3.00 parts of diethylenetriamine
52.18 parts of baryte
6.64 parts of "Bentone"

Adhesive B, resin 45.55 parts of liquid epoxide resin based on bisphenol-A, with an epoxide content of 5.4 equivalents/kg.
9.82 parts of cresyl glycid
18.22 parts of slate powder
22.78 parts of kaolin
1.36 parts of "Aerosil" (silica of high specific surface area)
2.27 parts of "Bentone 34" (polar compound of montmorillonite and organic ammonium base)

Curing agent 65.51 parts of "Verasamid 125" (a polyaminoamide of Schering AG, Bergkamen, West Germany)
6.68 parts of diethylenetriamine
4.34 parts of bisphenol-A
24.47 parts of polyethylene powder Adhesive A was used in the ratio of 100 parts of resin to 40 parts of curing agent and adhesive B in the ratio of 100:60. The epoxysilane was in each case mixed with the resin component.

EXAMPLE 3

In the manner described in Example 2, the tetrahydrophthalic acid glycidyl-γ-diethoxy-methylsilylpropyl ester of the following structure, of the Formula VIII $$\text{tetrahydrophthalic ring} \begin{cases} -COO \cdot CH_2 \cdot CH_2 \cdot CH_2 \cdot \overset{\underset{\displaystyle CH_3}{|}}{Si}(OC_2H_5)_2 \\ -COO \cdot CH_2 \cdot \underset{\underset{\displaystyle O}{\diagdown \diagup}}{CH} \cdot CH \end{cases} \quad \text{(VIII)}$$

is manufactured from tetrahydrophthalic acid allyl-glycidyl ester of the Formula VI by condensation with methyldiethoxysilane under analogous conditions. The compound has a boiling point of 150–153° C. under 0.001 mm.

The addition of 1% of the compound to the adhesive B (compare Table I following Example 2) gives the following values of the tensile shear strength in the water storage test at 20° C., after curing:

0 days: 200 kp./cm.² (without additive: 180 kp./cm.²)
30 days: 200 kp./cm.² (without additive: 150 kp./cm.²)
60 days: 210 kp./cm.² (without additive: 180 kp./cm.²)
90 days: 240 kp./cm.² (without additive: 120 kp./cm.²)

A similar improvement is shown in the tropical storage test (compare Table II, appended to Example 2): the addition of 1% of the Compound VIII to the adhesive A gives the following tensile shear strengths after curing:

0 days: 150 kp./cm.² (without additive: 130 kp./cm.²)
30 days: 170 kp./cm.² (without additive: 100 kp./cm.²)
60 days: 180 kp./cm.² (without additive: 90 kp./cm.²)
90 days: 180 kp./cm.² (without additive: 80 kp./cm.²)

EXAMPLE 4

In the manner described in Examples 1 and 2, phthalic acid monoallyl ester is first manufactured from phthalic anhydride and allyl alcohol is then converted, by means of epichlorohydrin, into the phthalic acid acid allyl-glycidyl ester of the following Formula IX $$\text{phenyl ring} \begin{cases} -COO \cdot CH_2 \cdot CH=CH_2 \\ -COO \cdot CH_2 \cdot \underset{\underset{\displaystyle O}{\diagdown \diagup}}{CH} \cdot CH_2 \end{cases} \quad \text{(IX)}$$

The compound has a boiling point of 127–130° C. under 0.001 mm. and an epoxide content of 3.78 equivalents/kg. (theory 3.82 equivalent/kg.).

Condensation of this compound with methyl-dimethoxy-silane as described in the preceding examples yields the phthalic acid glycidyl-γ-dimethoxy-methylsilylpropyl ester of the following structure X $$\text{phenyl ring} \begin{cases} -COO \cdot CH_2 \cdot CH_2 \cdot CH_2 \cdot \overset{\underset{\displaystyle CH_3}{|}}{Si}(OCH_3)_2 \\ -COO \cdot CH_2 \cdot \underset{\underset{\displaystyle O}{\diagdown \diagup}}{CH} \cdot CH \end{cases} \quad \text{(X)}$$

The compound has a boiling point of 162–165° C. under 0.04 mm. and an epoxide content of 2.7 equivalents/kg. (theory=2.63 equivalents/kg.). The addition of 1% of the Compound X to the adhesives A and B (compare Table II, appended to Example 2) gives the following values of the tensile shear strength in the tropical storage test, after curing:

Adhesive A 0 days 140 kp./cm.² (without additive: 130 kp./cm.²)
30 days 170 kp./cm.² (without additive: 100 kp./cm.²)
60 days 170 kp./cm.² (without additive: 90 kp./cm.²)
90 days 170 kp./cm.² (without additive. 80 kp./cm.²)

Adhesive B 0 days 200 kp./cm.² (without additive: 180 kp./cm.²)
30 days 200 kp./cm.² (without additive: 160 kp./cm.²)
60 days 200 kp./cm.² (without additive: 130 kp./cm.²)
90 days 210 kp./cm.² (without additive: 120 kp./cm.²)

We claim:
1. Epoxysilanes of the Formula I

$$A \begin{cases} -\overset{O}{\underset{\|}{C}}-O-CH_2-CH_2-CH_2-\overset{\underset{\displaystyle R'_a}{|}}{Si}-(OR)_{3-n} \\ -\underset{\|}{\overset{O}{C}}-C-O-CH_2-\underset{\underset{\displaystyle O}{\diagdown \diagup}}{CH}-CH_2 \end{cases} \quad \text{(I)}$$

in which A denotes a cyclohexane, cyclohexene or benzene ring, R and R' each denote an alkyl group with 1 to 4 carbon atoms and $n$ denotes 0, 1 or 2.

2. Epoxysilanes according to claim 1, characterized in that in the Formula I A denotes a cyclohexane or cyclohexene ring and $n$ denotes 0 or 1.

3. Epoxysilanes according to claim 2, characterized in that $n$ denotes 0.

4. Epoxysilanes according to claim 3, characterized in that in the Formula I R denotes the ethyl or methyl group.

References Cited
UNITED STATES PATENTS 3,455,877 7/1969 Plueddemann ____ 260—46.5
3,691,206 9/1972 Northrup ____ 260—348 SC NORMA S. MILESTONE, Primary Examiner U.S. Cl. X.R.

260—824 EP, 47 EP; 156—329, 330